(12) United States Patent
Hikone et al.

(10) Patent No.: US 12,092,222 B2
(45) Date of Patent: Sep. 17, 2024

(54) PISTON RING COMBINATION, AND INTERNAL COMBUSTION ENGINE

(71) Applicant: TPR Co., Ltd., Tokyo (JP)

(72) Inventors: Akira Hikone, Tokyo (JP); Kiyoyuki Kawai, Tokyo (JP)

(73) Assignee: TPR Co., Ltd., Tokyo (JP)

( * ) Notice: Subject to any disclaimer, the term of this patent is extended or adjusted under 35 U.S.C. 154(b) by 0 days.

(21) Appl. No.: 18/697,119

(22) PCT Filed: Jun. 20, 2022

(86) PCT No.: PCT/JP2022/024439
§ 371 (c)(1),
(2) Date: Mar. 29, 2024

(87) PCT Pub. No.: WO2023/053607
PCT Pub. Date: Apr. 6, 2023

(65) Prior Publication Data
US 2024/0263700 A1    Aug. 8, 2024

(30) Foreign Application Priority Data

Sep. 30, 2021    (JP) .................................. 2021-160908

(51) Int. Cl.
*F16J 9/20*    (2006.01)

(52) U.S. Cl.
CPC ...................................... *F16J 9/20* (2013.01)

(58) Field of Classification Search
CPC ........ F16J 9/20; F02F 5/00; F02F 3/28; F02F 11/002
See application file for complete search history.

(56) References Cited

U.S. PATENT DOCUMENTS

| | | | |
|---|---|---|---|
| 1,945,763 A * | 2/1934 | Winstead | F16J 9/20 277/461 |
| 2,511,458 A | 6/1950 | Bramberry | |
| 2,798,779 A | 7/1957 | Swartz et al. | |

(Continued)

FOREIGN PATENT DOCUMENTS

| | | |
|---|---|---|
| JP | S56-38138 U | 4/1981 |
| JP | H06-185620 A | 7/1994 |

(Continued)

OTHER PUBLICATIONS

Search Report in International Application No. PCT/JP2022/024439 dated Aug. 23, 2022, 2 pages.

(Continued)

*Primary Examiner* — Grant Moubry
(74) *Attorney, Agent, or Firm* — MARSHALL, GERSTEIN & BORUN LLP

(57) ABSTRACT

A combination of piston rings assembled to a piston of an internal combustion engine includes four compression rings. An outer peripheral surface of a first compression ring includes a barrel surface, an outer peripheral surface of a second compression ring includes an outer peripheral end portion and a taper surface, an outer peripheral surface of a third compression ring includes an outer peripheral end portion and a taper surface, and an outer peripheral surface of a fourth compression ring includes an outer peripheral end portion and a taper surface.

6 Claims, 12 Drawing Sheets

(56) References Cited

U.S. PATENT DOCUMENTS

| | | | | |
|---|---|---|---|---|
| 4,629,200 A | * | 12/1986 | Ruddy | F16J 9/28 |
| | | | | 277/936 |
| 4,815,429 A | * | 3/1989 | Thornton | F16J 9/20 |
| | | | | 277/467 |
| 2017/0276246 A1 | * | 9/2017 | Graczyk | F16J 9/12 |

FOREIGN PATENT DOCUMENTS

| | | |
|---|---|---|
| JP | H10-331973 A | 12/1998 |
| JP | 2011-214662 A | 10/2011 |
| JP | 2015-158247 A | 9/2015 |
| JP | 7307778 B2 | 7/2023 |
| WO | WO-2020100564 A1 * 5/2020 | ............... F02F 5/00 |

OTHER PUBLICATIONS

Office Action in JP Application No. 2021-160908 dated Aug. 23, 2022, 8 pages.
Decision of Refusal in JP Application No. 2021-160908 dated Jan. 17, 2023, 6 pages.
Decision to Grant a Patent in JP Application No. 2021-160908 dated Jun. 6, 2023, 2 pages.

\* cited by examiner

PISTON RING COMBINATION, AND INTERNAL COMBUSTION ENGINE

TECHNICAL FIELD

The present invention relates to a combination of piston rings assembled to a piston in an internal combustion engine and the internal combustion engine.

BACKGROUND ART

In an internal combustion engine mounted on a general automobile, it has been a practice to adopt a configuration in which a combination of piston rings including a compression ring (a pressure ring) and an oil ring is attached to ring grooves formed in a piston. In the axial direction of the piston, the compression ring is provided on a combustion chamber side, the oil ring is provided on a crank chamber side, and the compression ring and the oil ring slide on the inner wall surface of a cylinder to exert abilities. The oil ring most distant from the combustion chamber has an oil seal function of scraping off extra engine oil (lubricant) adhering to the inner wall surface of the cylinder to the crank chamber side to suppress outflow of the oil to the combustion chamber side (oil blow-by) and a function of adjusting an oil amount such that a lubricant film is appropriately held on the inner wall surface of the cylinder to prevent seizure of the compression ring and the piston involved in operation of the internal combustion engine. The compression ring has a gas seal function of maintaining airtightness to suppress outflow (blowby) of a combustion gas from the combustion chamber side to the crank chamber side and an oil seal function of scraping off extra oil not completely scraped off by the oil ring to suppress oil blow-by. In a general spark ignition engine or small and medium diesel engines, two compression rings and one oil ring are used.

In this connection, Patent Literature 1 discloses that, in an internal combustion engine in which a plurality of compression rings are assembled to a piston, a gas leak groove is formed on the lower surface of the compression ring closest to a combustion chamber.

CITATION LIST

Patent Document

Japanese Patent Application Laid-Open No. H10-331973

SUMMARY OF THE INVENTION

Technical Problem

According to an increase in output of an internal combustion engine in recent years, it is urgently necessary to take measures in environmental performance. In particular, a reduction in blowby gas is an important problem. A compression ring is more responsible for the reduction in the blowby gas than an oil ring. In compression ignition engines exemplified by a diesel engine, in particular, a large diesel engine, it has been a practice to use three or more compression rings and an oil ring so that, even if any one of the compression rings is subjected to wear or the like, a function of the compression rings can be maintained for a long time to reduce a maintenance frequency. In this case, a two piece-type oil ring is generally adopted as the oil ring. However, when the number of piston rings increases, a piston itself also increases in size accordingly, leading to a problem of an increase in an engine weight. For, in particular, small and medium diesel engines among the compression ignition engines and an engine having a relatively high compression ratio among spark ignition internal combustion engines represented by a gasoline engine, in recent years, in a range of an engine rotation range in use up to a medium speed range, there has been increasing necessity of realizing a further reduction in blowby and a further reduction in oil consumption.

An object of the present invention, which has been made in view of the problems described above, is to provide a technique capable of reducing a blowby gas in an internal combustion engine and suppressing an increase in oil consumption.

Solution to Problem

In order to solve the problems, the present invention has adopted the following configuration. That is, the present invention is a combination of a plurality of piston rings assembled to a piston mounted in a cylinder of an internal combustion engine, the combination of the piston rings including four compression rings, wherein an outer peripheral surface of a first compression ring assembled to a position closest to a combustion chamber of the internal combustion engine among the four compression rings includes a barrel surface including a top largest in diameter in the first compression ring and curved to be convex to a radial direction outer side in a cross section orthogonal to a peripheral length direction of the first compression ring, an outer peripheral surface of a second compression ring assembled to a position next closest to the combustion chamber after the first compression ring among the four compression rings includes an outer peripheral end portion largest in diameter in the second compression ring in a cross section orthogonal to a peripheral length direction of the second compression ring and a taper surface inclined to decrease in diameter from the outer peripheral end portion toward the combustion chamber side, an outer peripheral surface of a third compression ring assembled to a position next closest to the combustion chamber after the second compression ring among the four compression rings includes an outer peripheral end portion largest in diameter in the third compression ring in a cross section orthogonal to a peripheral length direction of the third compression ring and a taper surface inclined to decrease in diameter from the outer peripheral end portion toward the combustion chamber side, and an outer peripheral surface of a fourth compression ring assembled to a position most distant from the combustion chamber among the four compression rings includes an outer peripheral end portion largest in diameter in the fourth compression ring in a cross section orthogonal to a peripheral length direction of the fourth compression ring and a taper surface inclined to decrease in diameter from the outer peripheral end portion toward the combustion chamber side.

That is, the combination of the piston rings according to the present invention is configured by the first compression ring, the outer peripheral shape of which is a barrel shape, the second compression ring, the outer peripheral shape of which is a taper shape, the third compression ring, the outer peripheral shape of which is a taper shape, and the fourth compression ring, the outer peripheral shape of which is a taper shape. With such a combination of the piston rings, it is possible to reduce a blowby gas by using the four compression rings excellent in a gas seal property. It is possible to suppress an increase in oil consumption by setting the outer peripheral shape of three compression rings located on a crank chamber side among the four compression rings to the taper shape excellent in oil scraping performance. Since an oil ring is not used, it is possible to reduce an axial direction length of the piston and it is possible to reduce the piston in weight. It is possible to further suppress the increase in oil consumption by setting the outer peripheral shape of the second compression ring to the taper shape excellent in oil scraping performance.

In the present invention, in at least any one compression ring among the second compression ring, the third compression ring, and the fourth compression ring, a step-like cutout may be formed between a lower surface, which is an axial direction end face of the compression ring and faces a crank chamber side, and the outer peripheral end portion of the compression ring.

The present invention may be a combination of piston rings including four compression rings, wherein an outer peripheral surface of a first compression ring assembled to a position closest to a combustion chamber of the internal combustion engine among the four compression rings includes a barrel surface including a top largest in diameter in the first compression ring and curved to be convex to a radial direction outer side in a cross section orthogonal to a peripheral length direction of the first compression ring, an outer peripheral surface of a second compression ring assembled to a position next closest to the combustion chamber after the first compression ring among the four compression rings includes a barrel surface including a top largest in diameter in the second compression ring and curved to be convex to a radial direction outer side in a cross section orthogonal to a peripheral length direction of the second compression ring, an outer peripheral surface of a third compression ring assembled to a position next closest to the combustion chamber after the second compression ring among the four compression rings includes an outer peripheral end portion largest in diameter in the third compression ring in a cross section orthogonal to a peripheral length direction of the third compression ring and a taper surface inclined to decrease in diameter from the outer peripheral end portion toward the combustion chamber side, and an outer peripheral surface of a fourth compression ring assembled to a position most distant from the combustion chamber among the four compression rings includes an outer peripheral end portion largest in diameter in the fourth compression ring in a cross section orthogonal to a peripheral length direction of the fourth compression ring and a taper surface inclined to decrease in diameter from the outer peripheral end portion toward the combustion chamber side.

In the present invention, in at least any one compression ring of the third compression ring and the fourth compression ring, a step-like cutout may be formed between a lower surface, which is an axial direction end face of the compression ring and faces a crank chamber side, and the outer peripheral end portion of the compression ring.

In the present invention, when tension of the third compression ring is represented as Ft(3) and tension of the fourth compression ring is represented as F(4), Ft(4)≥Ft(3).

In the present invention, when size of a fitting gap of the third compression ring is represented as s1(3) and size of a fitting gap of the fourth compression ring is represented as s1(4), s1(3)≥s1(4).

In the present invention, a twist angle of the third compression ring may be 0' to −85' in a state in which the third compression ring is assembled to the piston and the piston is mounted in the cylinder.

The present invention may be an internal combustion engine including the combination of the piston rings explained above, wherein speed of the piston in a rotation range in use of the internal combustion engine may be lower than 18 m/s in average.

Advantageous Effects of Invention

According to the present invention, it is possible to reduce a blowby gas and suppress an increase in oil consumption in an internal combustion engine.

DESCRIPTION OF EMBODIMENTS

Preferred embodiments of the present invention are explained below with reference to the drawings. Note that configurations described in the embodiments explained below are not meant to limit the technical scope of the invention only to the embodiments unless particularly described otherwise. A combination of piston rings according to the present invention can be applied to an internal combustion engine. The internal combustion engine includes a spark ignition engine exemplified by a gasoline engine and a compression ignition engine exemplified by a diesel engine.

First Embodiment

Figure 1:
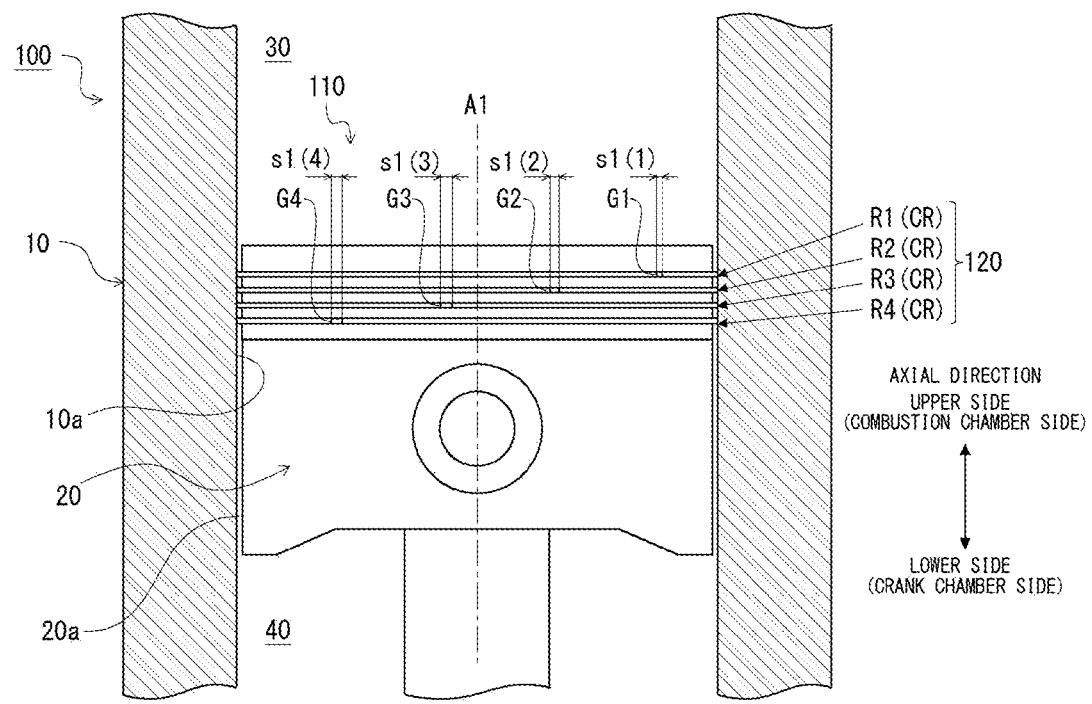
FIG. 1 is a diagram illustrating a part of an internal combustion engine including a piston structure according to a first embodiment.

FIG. 1 is a diagram illustrating a part of an internal combustion engine 100 including a combined structure (hereinafter, piston structure) 110 of a piston and a piston ring according to a first embodiment. In FIG. 1, a cross section extending along the center axis of the piston is illustrated. As illustrated in FIG. 1, the internal combustion engine 100 according to the first embodiment includes a cylinder 10, a piston 20 mounted in (inserted into) the cylinder 10, and a combination 120 of piston rings including a plurality of piston rings assembled to the piston 20. In the internal combustion engine 100, a combustion chamber side denoted by a reference numeral 30 is represented as an upper side and a crank chamber side denoted by a reference numeral 40 is represented as a lower side. In the internal combustion engine 100, a component including the piston 20 and the combination 120 of the piston rings is the piston structure 110. The piston structure 110 is explained below.

[Piston Ring]

As illustrated in FIG. 1, in the piston structure 110 according to the first embodiment, the combination 120 of the piston rings configured from four compression rings (pressure rings) in total including a first compression ring R1, a second compression ring R2, a third compression ring R3, and a fourth compression ring R4 is assembled to the piston 20. A compression ring is a sliding member that is assembled to a piston mounted in a cylinder of an internal combustion engine and slides on the inner wall surface of the cylinder according to a reciprocating motion of the piston. In the following explanation, when common components of the first compression ring R1, the second compression ring R2, the third compression ring R3, and the fourth compression ring R4 are explained without distinguishing the compression rings, the first compression ring R1, the second compression ring R2, the third compression ring R3, and the fourth compression ring R4 are simply referred to as compression rings CR.

The first compression ring R1 is the compression ring CR assembled to a position closest to the combustion chamber 30 among the four compression rings CR configuring the combination 120 of the piston rings. The second compression ring R2 is the compression ring CR assembled to a position next closest to the combustion chamber 30 after the first compression ring R1. The third compression ring R3 is the compression ring RC assembled to a position next closest to the combustion chamber 30 after the second compression ring R2. The fourth compression ring R4 is the compression ring CR assembled to a position next closest to the combustion chamber 30 after the third compression ring R3 and is the compression ring CR assembled to a position most distant from the combustion chamber 30 among the four compression rings CR.

In the following explanation, a state in which the piston rings are assembled to the piston 20 and the piston 20 is mounted in the cylinder 10 as illustrated in FIG. 1 is referred to as "use state". As illustrated in FIG. 1, a direction (an axial direction) extending along a center axis A1 of the piston ring is defined as "vertical direction" of the piston ring. In the axial direction of the piston ring, the combustion chamber 30 side (the upper side in FIG. 1) in the internal combustion engine 100 is defined as "upper side" and the opposite side of the combustion chamber 30 side, that is, a crank chamber side (the lower side in FIG. 1) is defined as "lower side". The compression ring CR has self-tension such that the outer peripheral surface of the compression ring CR presses an inner wall surface 10a of the cylinder 10 in the use state. Consequently, a gas seal function and an oil seal function are obtained.

Next, the outer peripheral shape of the compression ring adopted in the combination of the piston rings according to the present invention is explained. About the outer peripheral shape of the compression ring in this specification, a "barrel shape" indicates an outer peripheral shape including a barrel surface including a top largest in diameter in the compression ring and curved to be convex to a radial direction outer side. The "barrel shape" includes a "symmetrical barrel shape" in which the top of the barrel surface is located in the vertical center of the outer peripheral surface and the outer peripheral surface is vertically symmetrical and an "eccentric barrel shape" in which the top is separated from the vertical center position of the outer peripheral surface and the outer peripheral surface is vertically asymmetrical. The "taper shape" indicates an outer peripheral shape including an outer peripheral end portion largest in diameter in the compression ring and a taper surface inclined to decrease in diameter from the outer peripheral end portion toward the combustion chamber side. In the taper shape, an outer peripheral shape in which a step-like cutout is formed between the lower surface and the outer peripheral end portion is referred to as "taper undercut shape".

Figure 2:
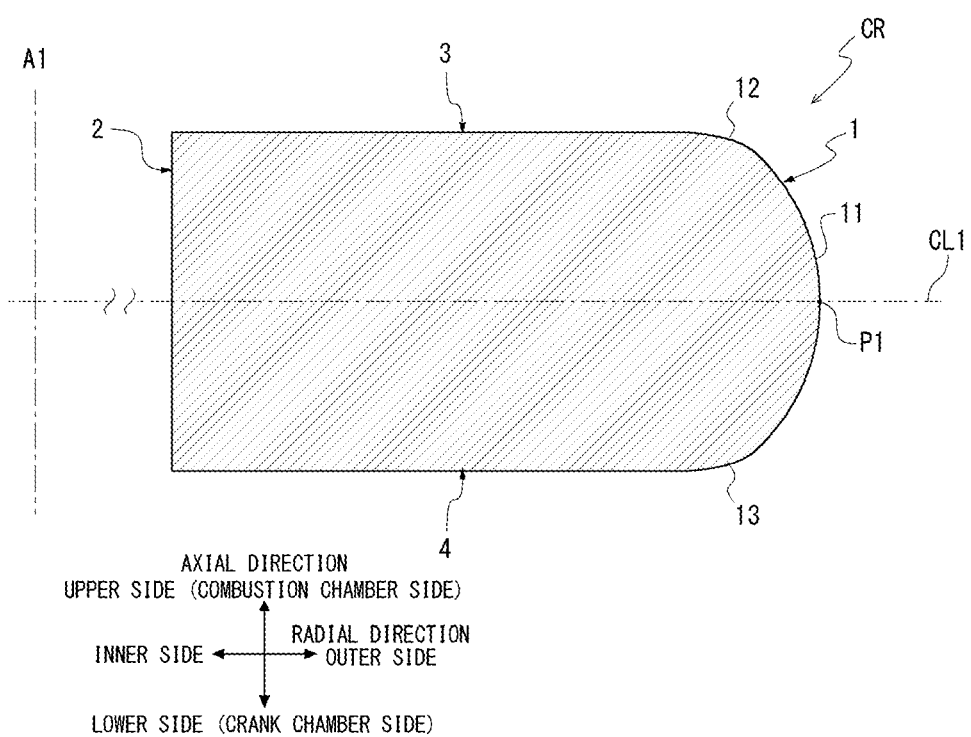
FIG. 2 is a sectional view of a compression ring, the outer peripheral shape of which is a barrel shape.
Figure 3:
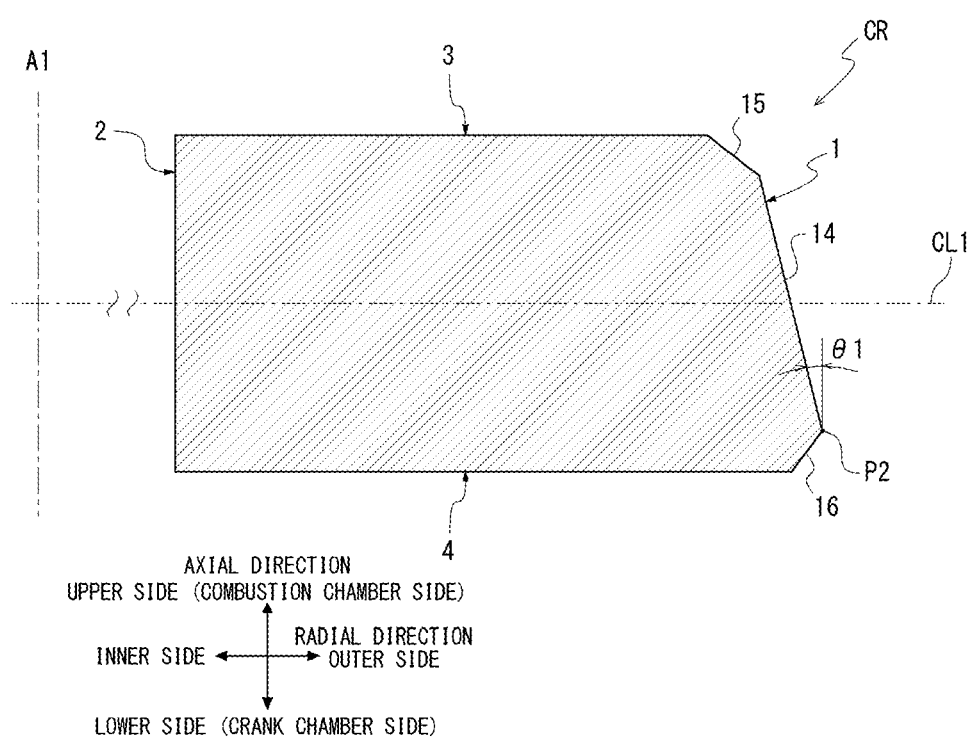
FIG. 3 is a sectional view of a compression ring, the outer peripheral shape of which is a taper shape.
Figure 4:
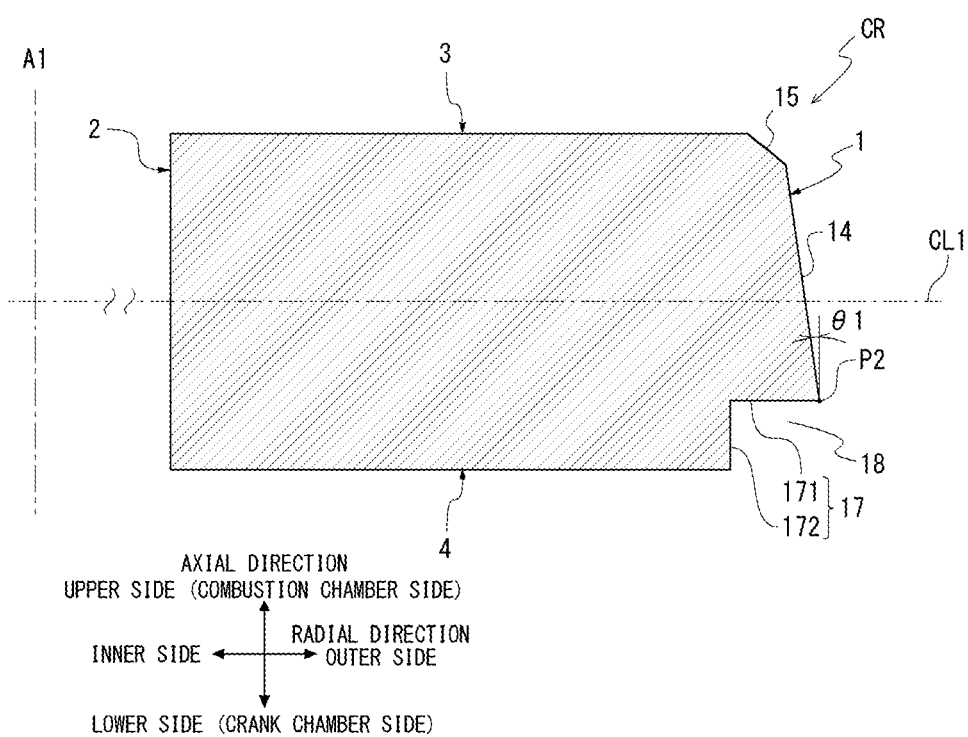
FIG. 4 is a sectional view of a compression ring, the outer peripheral shape of which is a taper undercut shape.

FIG. 2 is a sectional view of the compression ring CR, the outer peripheral shape of which is the barrel shape. FIG. 3 is a sectional view of the compression ring CR, the outer peripheral shape of which is the taper shape. FIG. 4 is a sectional view of the compression ring CR, the outer peripheral shape of which is the taper undercut shape. In FIG. 2 to FIG. 4, a cross section orthogonal to the peripheral length direction of the compression ring CR is illustrated. A reference sign CL1 in FIG. 2 to FIG. 4 denotes a straight line (a center line) passing the center in the axial direction of the compression ring CR.

As illustrated in FIG. 2 to FIG. 4, the compression ring CR includes an outer peripheral surface 1, an inner peripheral surface 2, an upper surface 3, and a lower surface 4. The width in the axial direction of the compression ring CR is defined by the upper surface 3 and the lower surface 4. The compression ring CR is assembled to the piston 20 such that, in the internal combustion engine 100, the upper surface 3, which is one of both end faces in the axial direction of the compression ring CR, faces the upper side, the lower surface 4, which is the other of both the end faces, faces the lower side, and the outer peripheral surface 1 is in slide contact with the inner wall surface 10a of the cylinder 10.

First, the barrel shape is explained with reference to FIG. 2. The outer peripheral surface 1 illustrated in FIG. 2 includes a barrel surface 11 and a pair of connection surfaces 12 and 13 respectively connecting the barrel surface 11 and the upper surface 3 and the lower surface 4. As illustrated in FIG. 2, the barrel surface 11 includes a top P1 largest in diameter in the compression ring CR and is curved to be convex to the radial direction outer side in the cross section orthogonal to the peripheral length direction of the compression ring CR. Consequently, the outer peripheral shape of the compression ring CR illustrated in FIG. 2 is the barrel shape. Note that, in FIG. 2, since the top P1 of the barrel surface 11 is located in the vertical center of the outer peripheral surface 1 and the outer peripheral surface 1 is vertically symmetrical, the outer peripheral shape of the compression ring CR is the symmetrical barrel shape. However, the shape of the barrel of the present invention is not limited to the symmetrical barrel shape and may be an eccentric barrel shape. For example, in FIG. 2, the top P1 of the barrel surface 11 may be located further on the lower side (the crank chamber side) than the vertical center position and the outer peripheral surface 1 may be vertically asymmetrical. The pair of connection surfaces 12 and 13 are so-called R surfaces (corners R) formed by chamfering and, in the cross section orthogonal to the peripheral length direction of the compression ring CR, is formed in an arcuate shape having a curvature radius different from the curvature radius of the barrel surface 11. As illustrated in FIG. 2, the connection surface 12 connects the upper edge of the barrel surface 11 and the outer peripheral edge of the upper surface 3. The connection surface 13 connects the lower edge of the barrel surface 11 and the outer peripheral edge of the lower surface 4. Note that, in the barrel shape, the pair of connection surfaces 12 and 13 are not essential components. For example, the outer peripheral surface 1 may not include the pair of connection surfaces 12 and 13 and the entire outer peripheral surface 1 may be formed as the barrel surface 11.

Next, the taper shape is explained with reference to FIG. 3. The outer peripheral surface 1 illustrated in FIG. 3 includes an outer peripheral end portion P2, a taper surface 14, and a pair of connection surfaces 15 and 16 respectively connecting the taper surface 14 and the upper surface 3 and the lower surface 4. As illustrated in FIG. 3, the outer peripheral end portion P2 is a part largest in diameter in the compression ring CR in the cross section orthogonal to the peripheral length direction of the compression ring CR. The outer peripheral end portion P2 illustrated in FIG. 3 is formed as a peripheral edge. However, the outer peripheral end portion P2 may be formed as a flat surface, the outer diameter of which is uniform irrespective of a position in the axial direction thereof. The lower edge of the taper surface 14 is connected to the outer peripheral end portion P2. The taper surface 14 is inclined to approach the center axis A1 (that is, decrease in diameter) from the outer peripheral end portion P2 toward the upper side (the combustion chamber 30 side) in the cross section orthogonal to the peripheral length direction of the compression ring CR. Consequently, the outer peripheral shape of the compression ring CR illustrated in FIG. 3 is the taper shape. As illustrated in FIG. 3, the connection surface 15 connects the upper edge of the taper surface 14 and the outer peripheral edge of the upper surface 3. The connection surface 16 connects the lower edge of the taper surface 14 and the outer peripheral edge of the lower surface 4. Note that, in the taper shape, the pair of connection surfaces 15 and 16 are not essential components. For example, the outer peripheral surface 1 may not include the pair of connection surfaces 15 and 16. The entire outer peripheral surface 1 may be formed as the taper surface 14.

Next, the taper undercut shape, which is a type of the taper shape, is explained with reference to FIG. 4. The outer peripheral surface 1 illustrated in FIG. 4 is different from the outer peripheral surface 1 illustrated in FIG. 3 in that the outer peripheral surface 1 illustrated in FIG. 4 includes an undercut surface 17 instead of the connection surface 16. Specifically, the outer peripheral surface 1 illustrated in FIG. 4 includes the outer peripheral end portion P2, the taper surface 14, the connection surface 15 connecting the taper surface 14 and the upper surface 3, and the undercut surface 17 connecting the taper surface 14 and the lower surface 4. As illustrated in FIG. 4, the undercut surface 17 recesses to the radial direction inner side with respect to the outer peripheral end portion P2, whereby a step-like cutout 18 is formed between the lower surface 4 and the outer peripheral end portion P2. The undercut surface 17 includes a first cut surface 171 extending from the outer peripheral end portion P2 to the radial direction inner side and a second cut surface 172 connecting the first cut surface 171 and the lower surface 4 and extending in the axial direction. The cutout 18 is formed over the entire periphery of the compression ring CR. Consequently, the outer peripheral shape of the compression ring CR illustrated in FIG. 4 is the taper undercut shape. Note that the cutout 18 may not always be formed over the entire periphery of the compression ring CR and may not be formed at a fitting end portion. The first cut surface 171 may be inclined with respect to the radial direction. The second cut surface 172 may be inclined with respect to the axial direction. Chamfering may be applied to the distal end of the outer peripheral end portion P2.

The outer peripheral shape of the compression ring adopted in the combination of the piston rings according to the present invention is explained above. However, the shape of the compression ring according to the present invention does not have to be the same as the shape illustrated in FIG. 2 to FIG. 4. For example, the edge portion of the compression ring may be formed in an internal bevel shape or an internal step shape. One or both of the upper and lower surfaces of the compression ring may be formed in a keystone shape.

[Piston]

Figure 5:
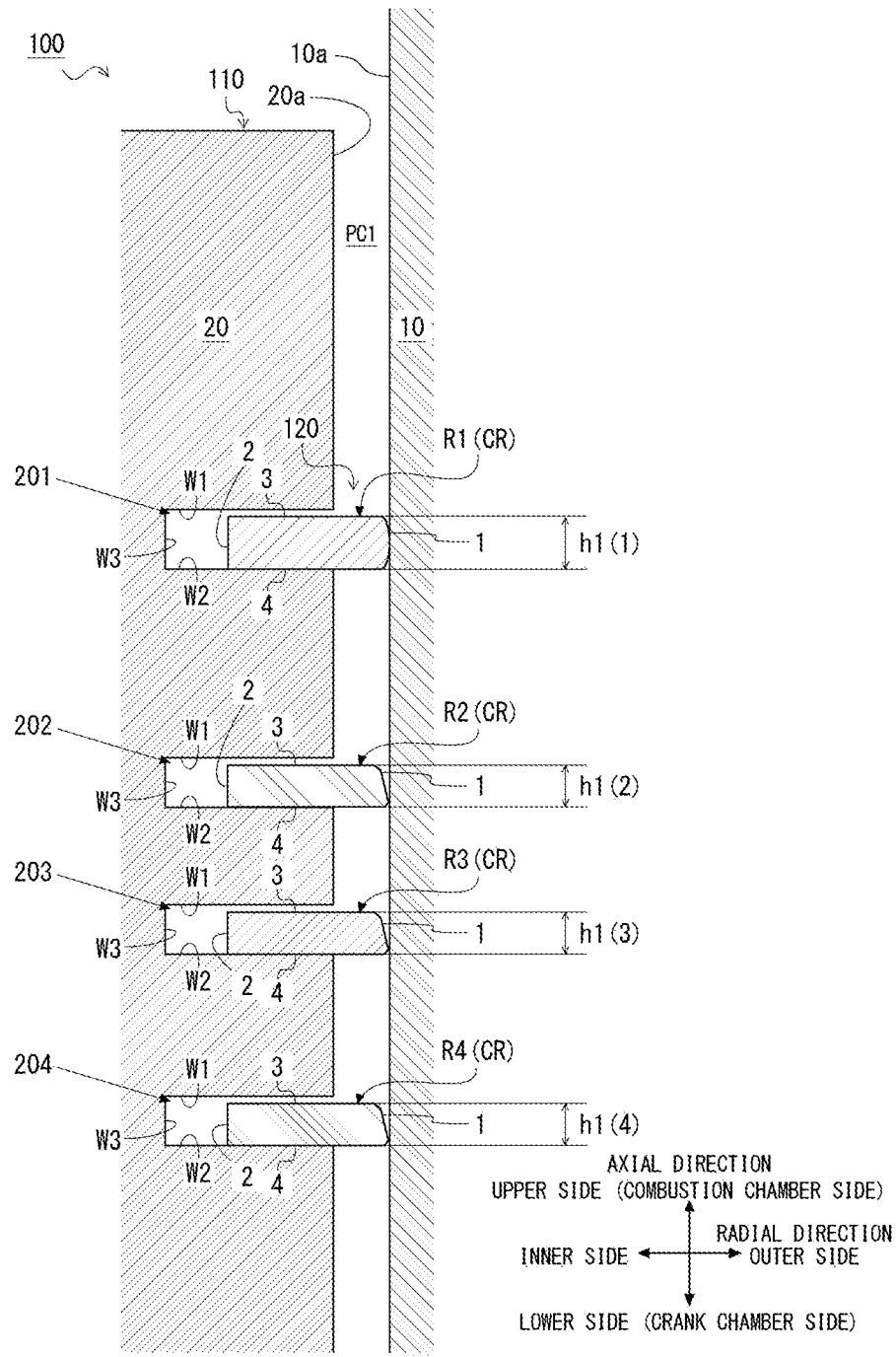
FIG. 5 is a sectional view of a piston structure of the internal combustion engine according to the first embodiment.

FIG. 5 is a sectional view of the piston structure 110 of the internal combustion engine 100 according to the first embodiment. In FIG. 5, a cross section extending along the center axis of the piston 20 is illustrated. As illustrated in FIG. 5, in the internal combustion engine 100, a predetermined separation distance D1 is secured between an outer peripheral surface 20a of the piston 20 and the inner wall surface 10a of the cylinder 10, whereby a piston clearance PC1 is formed. On the outer peripheral surface 20a of the piston 20, a first ring groove 201, a second ring groove 202, a third ring groove 203, and a fourth ring groove 204 are formed in order from the upper side (the combustion chamber 30 side) at predetermined intervals in the axial direction of the piston 20. In the following explanation, when the first ring groove 201, the second ring groove 202, the third ring groove 203, and the fourth ring groove 204 are explained without being distinguished, the first ring groove 201, the second ring groove 202, the third ring groove 203, and the fourth ring groove 204 are simply referred to as "ring grooves".

The ring grooves are formed in the entire periphery of the outer peripheral surface 20a as grooves extending annularly around the axis of the piston 20. As illustrated in FIG. 5, each of the ring grooves is formed to include a pair of groove walls (inner walls) vertically disposed to face each other. Of the pair of groove walls, the groove wall on the upper side is referred to as upper wall W1 and the groove wall on the lower side is referred to as lower wall W2. In each of the ring grooves, a groove wall connecting the inner peripheral edge of the upper wall W1 and the inner peripheral edge of the lower wall W2 is referred to as bottom wall W3. As illustrated in FIG. 5, the first compression ring R1 is attached to the first ring groove 201, the second compression ring R2 is attached to the second ring groove 202, the third compression ring R3 is attached to the third ring groove 203, and the fourth compression ring R4 is attached to the fourth ring groove 204.

[Combination of the Piston Rings]

As illustrated in FIG. 5, in the combination 120 of the piston rings according to the first embodiment, the outer peripheral shape of the first compression ring R1 is the barrel shape, the outer peripheral shape of the second compression ring R2 is the taper shape, the outer peripheral shape of the third compression ring R3 is the taper shape, and the outer peripheral shape of the fourth compression ring R4 is the taper shape.

Here, as illustrated in FIG. 5, the axial direction width of the first compression ring R1 is represented as h1(1), the axial direction width of the second compression ring R2 is represented as h1(2), the axial direction width of the third compression ring R3 is represented as h1(3), and the axial direction width of the fourth compression ring R4 is represented as h1(4). A total of the axial direction widths of the piston rings is represented as h1(total). That is, h1(total)=h1(1)+h1(2)+h1(3)+h1(4).

Comparative Example 1

Figure 6:
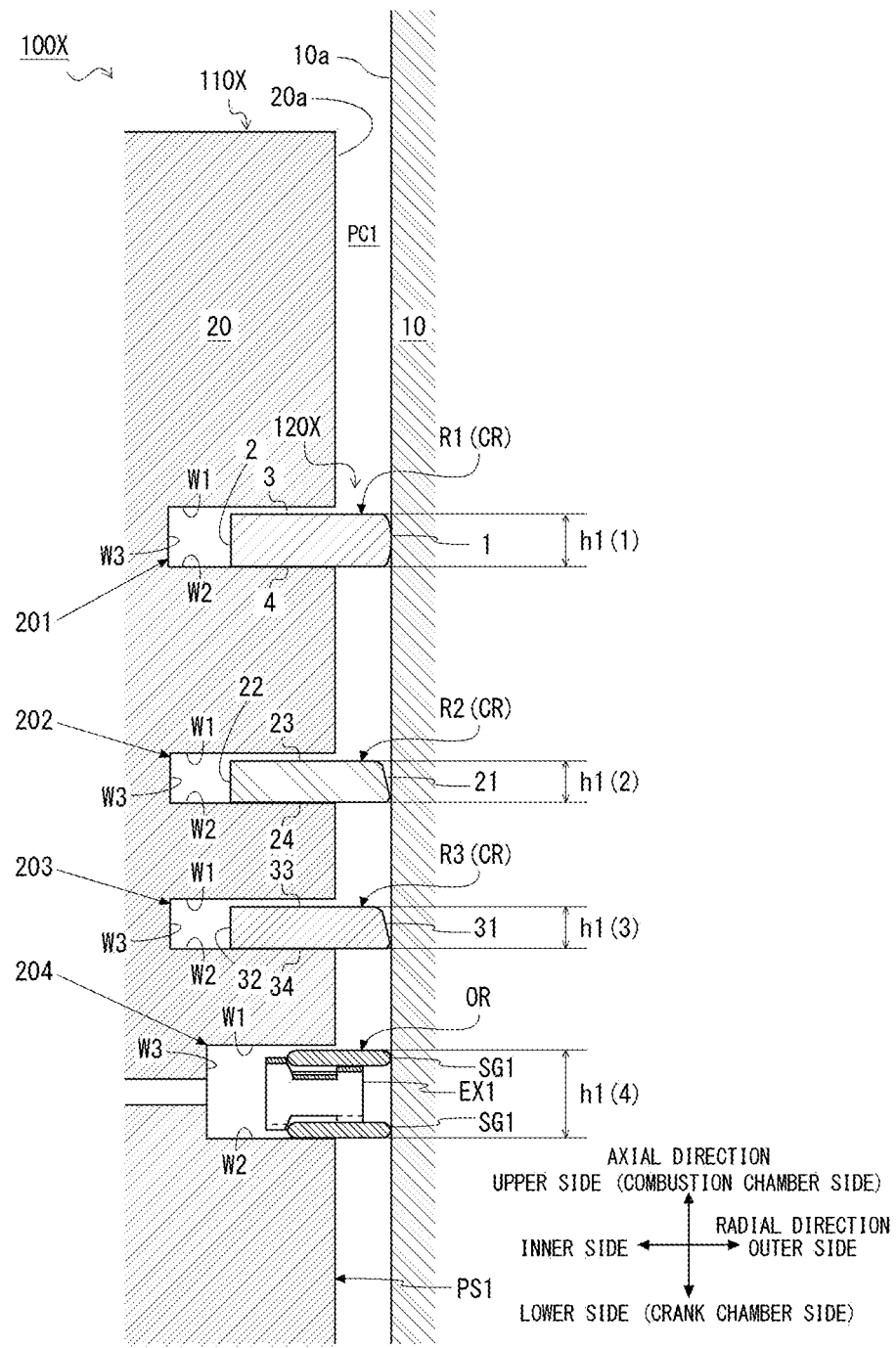
FIG. 6 is a sectional view of a piston structure of an internal combustion engine according to a comparative example 1.

FIG. 6 is a sectional view of a piston structure 110X of an internal combustion engine 100X according to a comparative example 1. The piston structure 110X according to the comparative example 1 includes a combination 120X of piston rings including three compression rings CR and one oil ring OR. The piston structure 110X according to the comparative example 1 is different from the piston structure 110 according to the first embodiment in that the combination 120X of the piston rings includes the oil ring OR instead of the fourth compression ring R4.

Comparative Example 2

Figure 7:
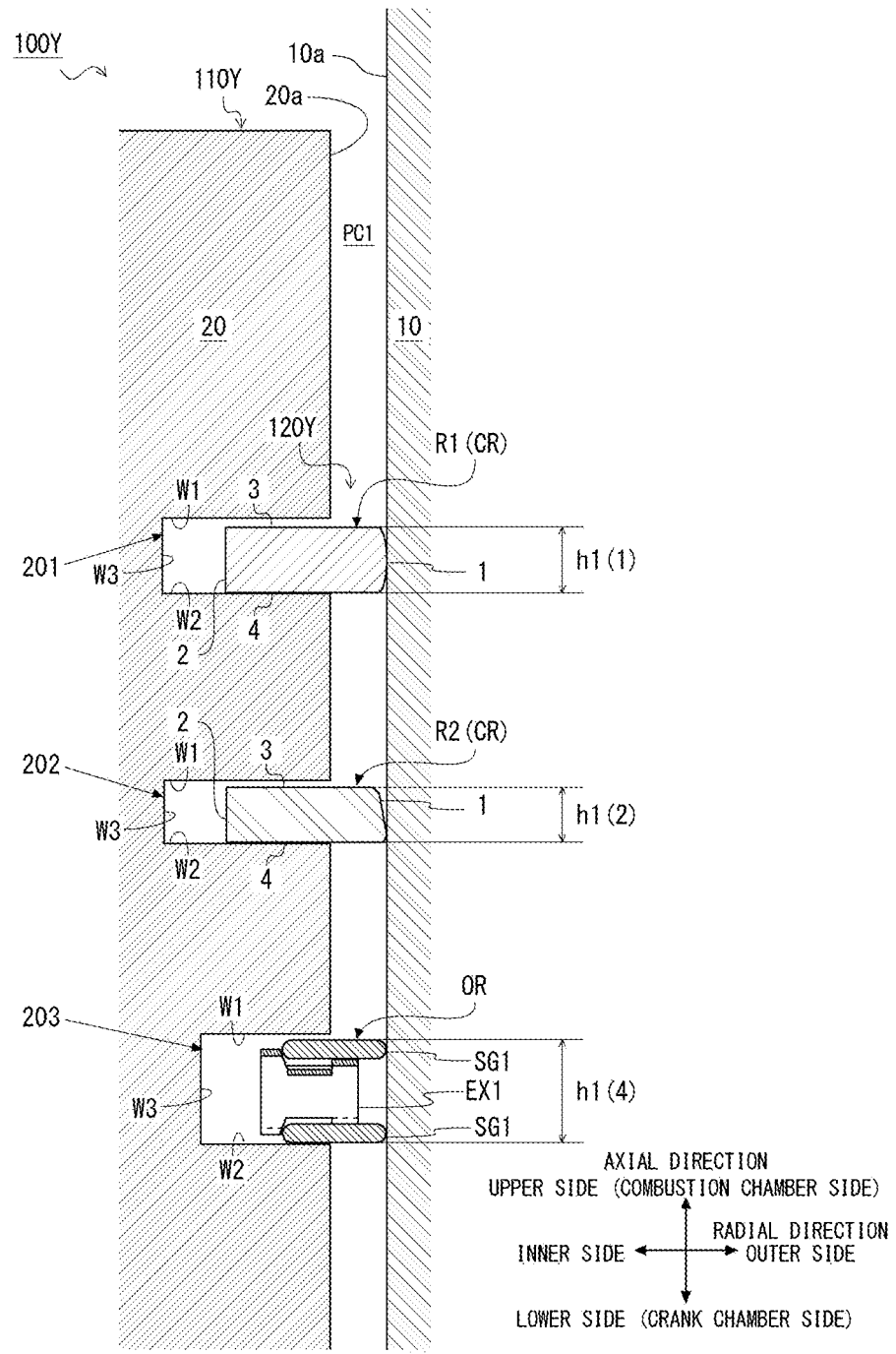
FIG. 7 is a sectional view of a piston structure of an internal combustion engine according to a comparative example 2.

FIG. 7 is a sectional view of a piston structure 110Y of an internal combustion engine 100Y according to a comparative example 2. The piston structure 110Y according to the comparative example 2 includes a combination 120Y of piston rings including two compression rings CR and one oil ring OR. The piston structure 110Y according to the comparative example 2 is different from the piston structure 110 according to the first embodiment in the following points. In the comparative example 2, the fourth ring groove 204 is not formed in the piston 20. The combination 120Y of the piston rings according to the comparative example 2 does not include the fourth compression ring R4 and includes the oil ring OR instead of the third compression ring R3. The oil ring OR is an oil ring of a so-called three piece-type and includes a pair of segments SG1 and SG1 that slides on the inner wall surface 10a of the cylinder 10 and a spacer expander EX1 that urges the pair of segments SG1 and SG1 to the radial direction outer side (the inner wall surface 10a side).

[Action and Effects]

As explained above, the combination 120 of the piston rings according to the first embodiment is configured by the four compression rings CR. That is, in the combination 120 of the piston rings, the three piece-type oil ring and the two piece-type oil ring in the comparative example 1 and the comparative example 2 explained above are not used and only the four compression rings are used. With the combination 120 of the piston rings including the four compression rings explained above, it is possible to further reduce the blowby gas than in the comparative example 1 and the comparative example 2 by using the four compression rings more excellent in gas seal performance than the oil ring. Further, the combination 120 of the piston rings exerts oil seal performance with a combination of the third compression ring R3 and the fourth compression ring R4. Therefore, it is possible to reduce a blowby gas while suppressing an increase in oil consumption. In general, a compression ring is smaller in an axial direction width compared with an oil ring. Therefore, in a piston, an axial direction width necessary for a region for attaching the compression ring may be smaller than an axial direction width necessary for a region for attaching the oil ring. Therefore, in comparison with the comparative example 2 in which the number of piston rings is four that is the same as the number of piston rings in the combination 120 of the piston rings, the axial direction length of the piston 20 can be reduced by using, in the combination 120 of the piston rings, instead of the oil ring OR, the fourth compression ring R4 thinner than the oil ring OR. Consequently, it is possible to reduce the piston 20 in weight and improve fuel economy of the internal combustion engine 100. Further, in the combination 120 of the piston rings, it is possible to suppress deterioration in oil by reducing a blowby gas with the four compression rings CR. In addition, by not using the oil ring, it is possible to improve sticking resistance and suppress adhesion of the piston rings due to carbon and sludge.

Further, in the combination 120 of the piston rings according to the first embodiment, the outer peripheral shape of the first compression ring R1 is the barrel shape, the outer peripheral shape of the second compression ring R2 is the taper shape, the outer peripheral shape of the third compression ring R3 is the taper shape, and the outer peripheral shape of the fourth compression ring R4 is the taper shape. With the combination 120 of the piston rings explained above, by setting the outer peripheral shape of the three compression rings CR located on the crank chamber 40 side among the four compression rings CR to the taper shape excellent in oil scraping performance, it is possible to suppress an increase in oil consumption without even if the oil ring is not used. That is, with the combination 120 of the piston rings according to the first embodiment, it is possible to suppress not only a blowby gas but also an increase in oil consumption.

Note that, in the combination 120 of the piston rings according to the first embodiment, the outer peripheral shape of at least any one compression ring CR among the second compression ring R2, the third compression ring R3, and the fourth compression ring R4 may be set to the taper undercut shape. The taper undercut shape is preferably applied to the compression ring CR more distant from the combustion chamber 30 (closer to the crank chamber 40). Therefore, it is more preferable to set the outer peripheral shape of the fourth compression ring R4 to the taper undercut shape. Consequently, it is possible to further reduce the oil consumption.

Here, the tension of the first compression ring R1 is represented as Ft(1), the tension of the second compression ring R2 is represented as Ft(2), the tension of the third compression ring R3 is represented as Ft(3), the tension of the fourth compression ring R4 is represented as Ft(4), and a total of the tensions of the piston rings is represented as Ft(TOTAL). That is, Ft(TOTAL)=Ft(1)+Ft(2)+Ft(3)+Ft(4). At this time, in the viewpoints of a reduction in oil consumption and suppression of friction, it is preferable that Ft(4)>Ft(3). By setting the tension of the fourth compression ring R4 most distant from the combustion chamber 30 among the four compression rings CR to be equal to or larger than the tension of the third compression ring R3 and improving oil scraping performance of the fourth compression ring R4, it is possible to reduce oil consumption while suppressing an increase in Ft(TOTAL). That is, it is possible to reduce oil consumption and prevent a sum of frictions of the four compression rings CR from increasing. However, a relation among the tensions of the compression rings in the present invention is not limited to this.

Here, a reference sign G1 in FIG. 1 denotes a fitting gap formed in the first compression ring R1, a reference sign G2 in FIG. 1 denotes a fitting gap formed in the second compression ring R2, a reference sign G3 in FIG. 1 denotes a fitting gap formed in the third compression ring R3, and a reference sign G4 in FIG. 1 denotes a fitting gap formed in the fourth compression ring R4. The width (specifically, an interval between fitting end faces) of the fitting gap G1 of the first compression ring R1 is represented as s1(1), the width of the fitting gap G2 of the second compression ring R2 is represented as s1(2), the width of the fitting gap G3 of the third compression ring R3 is represented as s1(3), and the width of the fitting gap G4 of the fourth compression ring R4 is represented as s1(4). At this time, in the viewpoint of a reduction in oil consumption, it is preferable that s1(3)≥s1(4). By setting the width of the fitting gap G3 of the third compression ring R3 to be equal to or larger than the width of the fitting gap G4 of the fourth compression ring R4, it is possible to maintain an effect of blowing down oil with by a blowby gas from the fitting gap G3 of the third compression ring R3 and suppress an oil blow-by from the fitting gap G4 of the fourth compression ring R4. Consequently, it is possible to further reduce the oil consumption. However, the width of a fitting gap in the present invention is not limited to this. In the viewpoint of a reduction in a blowby gas as well, it is preferable that s1(3)≥s1(4). It is possible to reduce the blowby gas by setting the width of the fitting gap G4 of the fourth compression ring R4 closest to the crank chamber 40 to be equal to or smaller than the fitting gap G3 of the third compression ring R3.

Figure 8:
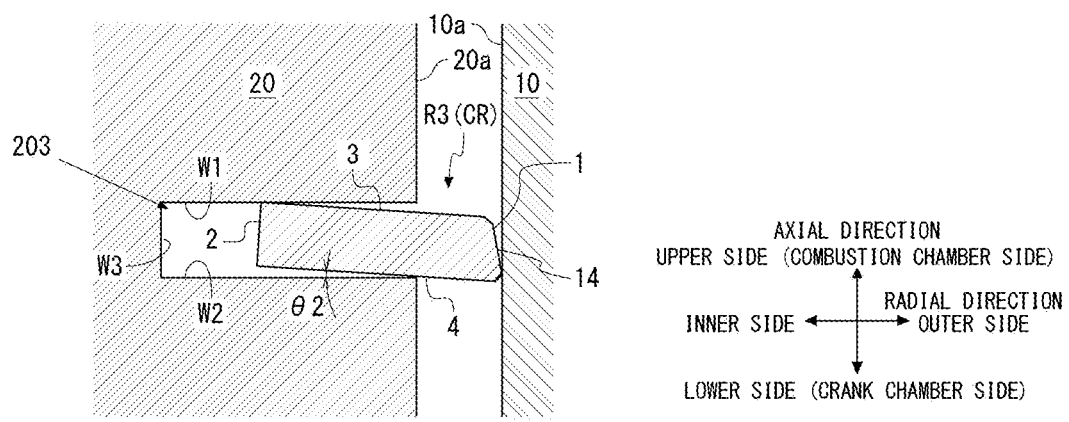
FIG. 8 is a sectional view illustrating a state in which a third compression ring is twisted in a third ring groove.

In the viewpoint of oil seal performance of the third compression ring R3, it is preferable that a twist angle of the third compression ring R3 is 0' to −85' in a use state in which the third compression ring R3 is assembled to the piston 20 and the piston 20 is mounted in the cylinder 10. The twist angle is defined as an inclination angle of an axial direction end face (a vertical surface) of the third compression ring R3 with respect to the horizontal plane (a plane orthogonal to the axis of the piston). The twist angle is set to a positive value when the axial direction end face is inclined upward (to the combustion chamber side) toward the radial direction outer side and is set to a negative value when the axial direction end face is inclined downward (to the crank chamber side) toward the radial direction outer side. For measurement of the twist angle, for example, a method of measuring the axial direction end face using a surface roughness meter or the like and calculating a twist angle may be used in a state in which the third compression ring R3 with a fitting opening thereof closed is inserted into a ring gauge for measurement having a diameter equal to a diameter d1 of a cylinder bore. FIG. 8 is a sectional view illustrating a state in which the third compression ring R3 is twisted in the third ring groove 203. θ2 in FIG. 8 indicates a twisting angle. The third compression ring R3 is twisted to incline downward (twisted to negative) in the range described above in the use state, whereby, as illustrated in FIG. 8, the upper surface 3 of the third compression ring R3 comes into contact with the upper wall W1 of the third ring groove 203 and the lower surface 4 comes into contact with the lower wall W2 of the third ring groove 203. Consequently, oil about to sneak to the rear surface (the radial direction inner side) of the third compression ring R3 without being scraped off by the fourth compression ring R4 is sealed by the third compression ring R3. By improving the oil seal performance of the upper surface 3 and the lower surface 4 of the third compression ring R3 as explained above, it is possible to prevent an oil blow-by and reduce oil consumption. Here, θ1 in FIG. 3 and FIG. 4 indicates an inclination angle of the taper surface 14 of the third compression ring R3 with respect to the axial direction. θ1 is set to a positive value when the taper surface 14 inclines to approach the center axis A1 toward the upper side as illustrated in FIG. 3 and FIG. 4. At this time, θ1 is preferably 1° 30' to 5° and is desirably larger than the absolute value of the twist angle θ2 of the third compression ring R3. That is, it is desirable that θ1+θ2>0. By setting θ1 larger than the absolute value of θ2, an effect of riding up on oil by the taper surface 14 is obtained. It is possible to prevent oil from being scraped up.

Figure 9:
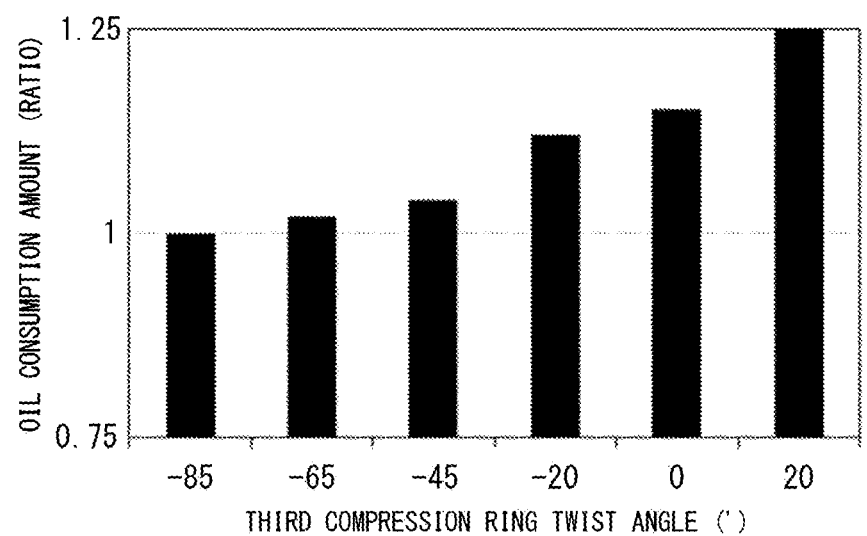
FIG. 9 is a graph illustrating a relation between a twist angle of the third compression ring and an oil consumption amount.

FIG. 9 is a graph illustrating a relation between a twist angle (a twist amount) of the third compression ring R3 and an oil consumption amount in the internal combustion engine 100 according to the first embodiment. The horizontal axis of FIG. 9 indicates the twist angle of the third compression ring R3 and the vertical axis of FIG. 9 indicates a ratio of the oil consumption amount. As illustrated in FIG. 9, when the twist angle is 0' to −85', the oil seal performance of the third compression ring R3 is sufficiently exerted and oil consumption markedly decreases. Note that it is likely that a stick phenomenon occurs if the twist angle of downward inclination exceeds −85'. By setting the twist angle of the third compression ring R3 to 0' to −85' as explained above, it is possible to suitably improve the oil seal performance of the third compression ring R3 and reduce the oil consumption. However, the twist angle of the third compression ring according to the present invention is not limited to 0' to −85'. Note that, in order to prevent the oil from sneaking to the rear surface of the third compression ring R3, it is also effective to reduce a gap (a back clearance) between the inner peripheral surface 2 of the third compression ring R3 and the bottom wall W3 of the third ring groove 203. In the viewpoint of a reduction in oil consumption, it is also effective to reduce a gap (a side clearance) between the upper surface 3 of the third compression ring R3 and the upper wall W1 of the third ring groove 203 and a gap (a side clearance) between the upper surface 3 of the fourth compression ring R4 and the upper wall W1 of the fourth ring groove 204.

Figure 10:
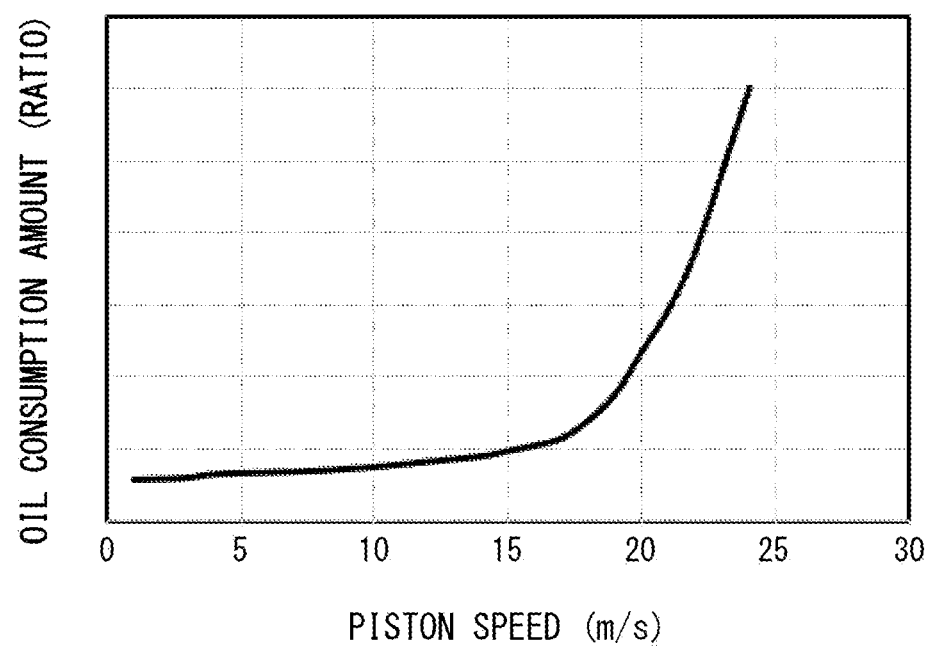
FIG. 10 is a graph illustrating a relation between speed of a piston and an oil consumption amount.

The combination 120 of the piston rings according to the first embodiment can suitably reduce a blowby gas and oil consumption in an internal combustion engine in which average speed of a piston in a rotation range in use (an operation range) of the internal combustion engine is up to a medium speed range. Specifically, speed of the piston in the rotation range in use of the internal combustion engine is preferably lower than 18 m/s in average. However, the present invention is not limited to this. FIG. 10 is a graph illustrating a relation between speed of the piston 20 and an oil consumption amount in the internal combustion engine 100 according to the first embodiment. The horizontal axis of FIG. 10 indicates the speed of the piston 20 and the vertical axis of FIG. 10 indicates a ratio of the oil consumption amount. As illustrated in FIG. 10, when the speed of the piston 20 is up to a middle speed range lower than 18 m/s, the oil consumption markedly decreases.

As explained above, with the combination 120 of the piston rings according to the first embodiment, for, in particular, a small diesel engine mounted on a passenger car among compression ignition engines represented by a diesel engine and an engine having a relatively high compression ratio among spark ignition engines represented by a gasoline engine, it is possible to suppress an increase in an oil consumption amount while suppressing an increase in a blowby gas in a range in which a rotation range in use is up to a medium speed range. However, the combination of the piston rings according to the present invention can also be applied to a spark ignition engine not having a high compression ratio. The same effect can be expected in a large diesel engine. In a two-stroke engine, in particular, a large diesel engine, as well, it is possible to achieve a reduction in a blowby gas by applying the present invention.

Second Embodiment

Figure 11:
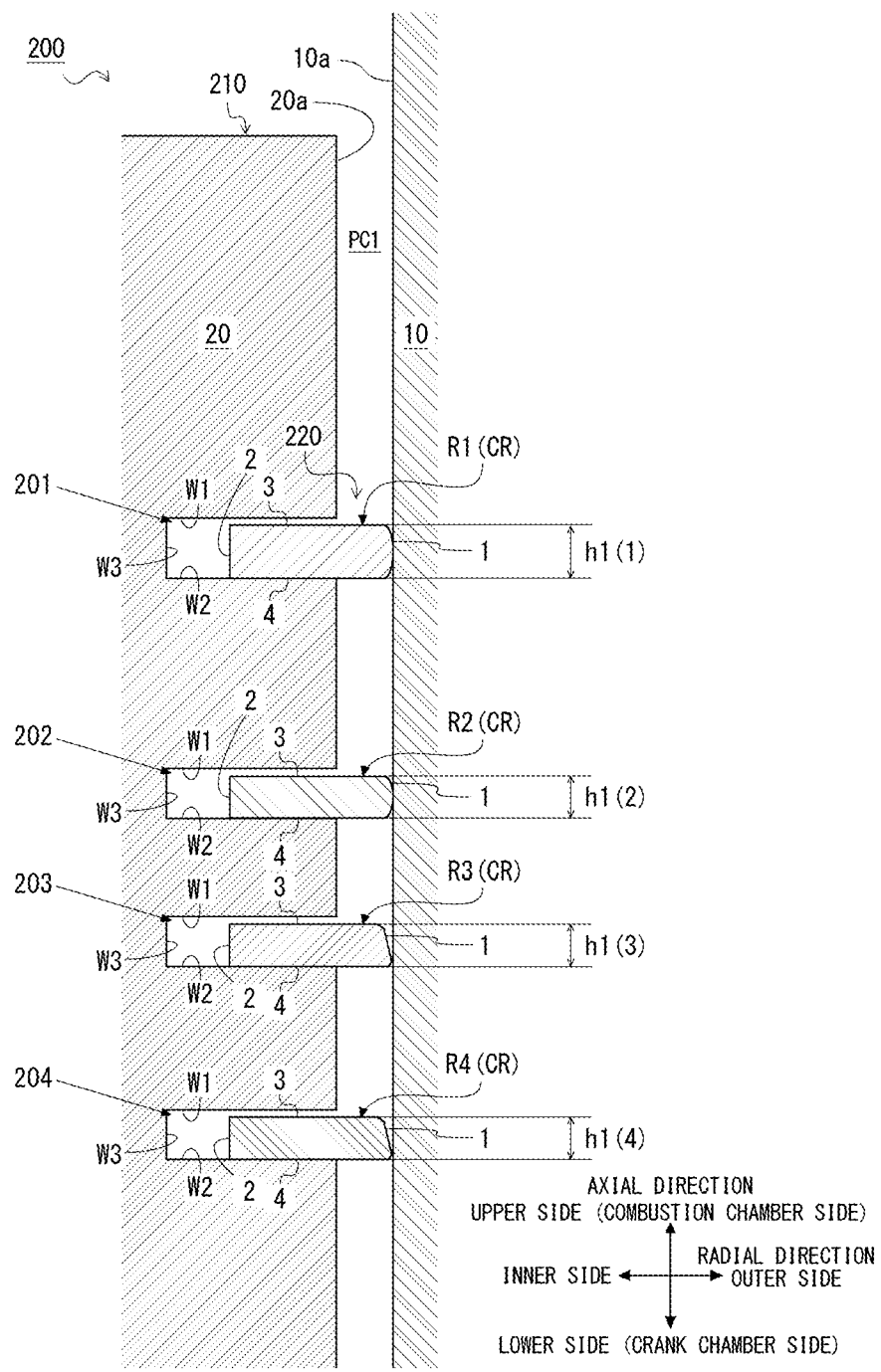
FIG. 11 is a sectional view of a piston structure of an internal combustion engine according to a second embodiment.

A piston structure according to a second embodiment is explained below. In the following explanation, differences from the piston structure 110 in the first embodiment are mainly explained. Detailed explanation of the same components as the components in the first embodiment is omitted by adding the same reference numerals and signs to the components. FIG. 11 is a sectional view of a piston structure 210 of an internal combustion engine 200 according to the second embodiment. In FIG. 11, a cross section taken along the center axis of the piston 20 is illustrated. As illustrated in FIG. 11, in a combination 220 of piston rings according to the second embodiment, the outer peripheral shape of the first compression ring R1 is a barrel shape, the outer peripheral shape of the second compression ring R2 is a barrel shape, the outer peripheral shape of the third compression ring R3 is a taper shape, and the outer peripheral shape of the fourth compression ring R4 is a taper shape. That is, the combination 220 of the piston rings according to the second embodiment is different from the combination 120 of the piston rings according to the first embodiment in that the outer peripheral shape of the second compression ring R2 is the barrel shape.

With the combination 220 of the piston rings according to the second embodiment, like the combination 120 of the piston rings according to the first embodiment, it is possible to reduce a blowby gas by using four compression rings excellent in a gas seal property and it is possible to suppress an increase in an oil consumption amount by setting the outer peripheral shape of two compression rings located on a crank chamber side among the four compression rings to the taper shape excellent in oil scraping performance. Since an oil ring is not used, it is possible to reduce the axial direction length of the piston 20 and it is possible to reduce the piston 20 in weight. With the combination 220 of the piston rings according to the second embodiment, it is possible to further reduce the blowby gas by setting the outer peripheral shape of the second compression ring R2 to the barrel shape excellent in gas seal performance.

Note that, in the combination 220 of the piston rings according to the second embodiment, the outer peripheral shape of at least one compression ring CR of the third compression ring R3 and the fourth compression ring R4 may be set to a taper undercut shape. The taper undercut shape is preferably applied to the compression ring CR more distant from the combustion chamber 30 (closer to the crank chamber 40). Therefore, it is more preferable to set the outer peripheral shape of the fourth compression ring R4 to the taper undercut shape. Consequently, it is possible to further suppress the increase in oil consumption.

In the combination 220 of the piston rings according to the second embodiment as well, by setting Ft(4)≥Ft(3), it is possible to suppress an increase in friction while suppressing an increase in oil consumption. It is possible to further reduce the oil consumption and the blowby gas by setting s1(3)≥s1(4). It is possible to further reduce the oil consumption by setting a twist angle of the third compression ring R3 in a use state to 0' to −85'. In the combination 220 of the piston rings according to the second embodiment as well, for a reduction in oil consumption, it is preferable that the speed of a piston in a rotation range in use of an internal combustion engine is lower than 18 m/s in average. However, the present invention is not limited to the above description. The outer peripheral shape of the third compression ring R3 may be set to the barrel shape. Consequently, it is possible to further reduce the blowby gas.

EXAMPLES

In Table 1, types and shapes of piston rings in combinations of the piston rings in examples 1 to 3 of the present invention and comparative examples 1 and 2 are illustrated. In Table 2, axial direction widths, tensions, and widths of fitting gaps of the piston rings in the combinations of the piston rings in the examples 1 to 3 of the present invention and the comparative examples 1 and 2 are illustrated. In Table 1 and Table 2, piston rings assembled to a piston are represented as a first ring, a second ring, a third ring, and a fourth ring in order from a combustion chamber side. "Barrel" in Table 1 means that an outer peripheral shape is the barrel shape illustrated in FIG. 2 and "taper" means that the outer peripheral shape is the taper shape illustrated in FIG. 3. Note that the outer diameter of the rings is set to 80 mm.

TABLE 1

| | First ring | | Second ring | | Third ring | | Fourth ring | |
|---|---|---|---|---|---|---|---|---|
| | Type | Shape | Type | Shape | Type | Shape | Type | Shape |
| Example 1 | Compression ring | Barrel | Compression ring | Taper | Compression ring | Taper | Compression ring | Taper |
| Example 2 | Compression ring | Barrel | Compression ring | Barrel | Compression ring | Taper | Compression ring | Taper |
| Example 3 | Compression ring | Barrel | Compression ring | Taper | Compression ring | Taper | Compression ring | Taper |
| Comparative example 1 | Compression ring | Barrel | Compression ring | Taper | Compression ring | Taper | Oil ring | 3-piece type |
| Comparative example 2 | Compression ring | Barrel | Compression ring | Taper | Oil ring | 3 piece-type | — | — |

TABLE 2

| | Ring outer diameter: 80 mm | | | | | | | | | | | | | |
|---|---|---|---|---|---|---|---|---|---|---|---|---|---|---|
| | First ring | | | Second ring | | | Third ring | | | Fourth ring | | | Ring total | |
| | h1(1) | Ft(1) | s1(1) | h1(2) | Ft(2) | s1(2) | h1(3) | Ft(3) | s1(3) | h1(4) | Ft(4) | s1(4) | h1 (total) | Ft(total) |
| Example 1 | 1.2 | 4.3 | 0.20 | 0.8 | 3.0 | 0.40 | 0.8 | 5.0 | 0.40 | 0.8 | 8.0 | 0.20 | 3.6 | 20.3 |
| Example 2 | 1.2 | 4.3 | 0.20 | 0.8 | 3.0 | 0.40 | 0.8 | 5.0 | 0.40 | 0.8 | 8.0 | 0.20 | 3.6 | 20.3 |
| Example 3 | 1.2 | 4.3 | 0.20 | 0.8 | 3.0 | 0.40 | 0.8 | 5.0 | 0.40 | 0.8 | 4.0 | 0.60 | 3.6 | 16.3 |
| Comparative example 1 | 1.2 | 4.3 | 0.20 | 0.8 | 3.0 | 0.40 | 0.8 | 2.5 | 0.60 | 1.5 | 16.0 | 0.25 | 4.3 | 25.8 |
| Comparative example 2 | 1.2 | 4.3 | 0.20 | 1.0 | 3.0 | 0.40 | 1.5 | 16.0 | 0.25 | — | — | — | 3.7 | 23.3 |

TABLE 2-continued

Ring outer diameter: 80 mm

| First ring | | | Second ring | | | Third ring | | | Fourth ring | | | Ring total | |
|---|---|---|---|---|---|---|---|---|---|---|---|---|---|
| h1(1) | Ft(1) | s1(1) | h1(2) | Ft(2) | s1(2) | h1(3) | Ft(3) | s1(3) | h1(4) | Ft(4) | s1(4) | h1 (total) | Ft(total) |
| Unit (mm) | Unit (N) | Unit (mm) | | | | | | | | | | | |

In the example 1 and the example 3, the combination of the piston rings are configured the same as the combination 120 of the piston rings according to the first embodiment illustrated in FIG. 5. In the example 2, the combination of the piston rings is configured the same as the combination 220 of the piston rings according to the second embodiment illustrated in FIG. 11. In the comparative example 1, the combination of the piston rings is configured the same as the combination 120X of the piston rings according to the comparative example 1 illustrated in FIG. 6. In the comparative example 2, the combination of the piston rings is configured the same as the combination 120Y of the piston rings according to the comparative example 2 illustrated in FIG. 7.

As illustrated in Table 2, in the example 1 and the example 2, s1(3)>s1(4). In the example 3, s1(3)<s1(4). Ft(TOTAL) is equivalent in the examples 1 and 2. In the examples 1 to 3, h1(TOTAL) is smaller than h1(TOTAL) in both of the comparative examples 1 and 2. In the examples 1 to 3, Ft(TOTAL) is smaller than Ft(TOTAL) in both of the comparative examples 1 and 2.

Figure 12:
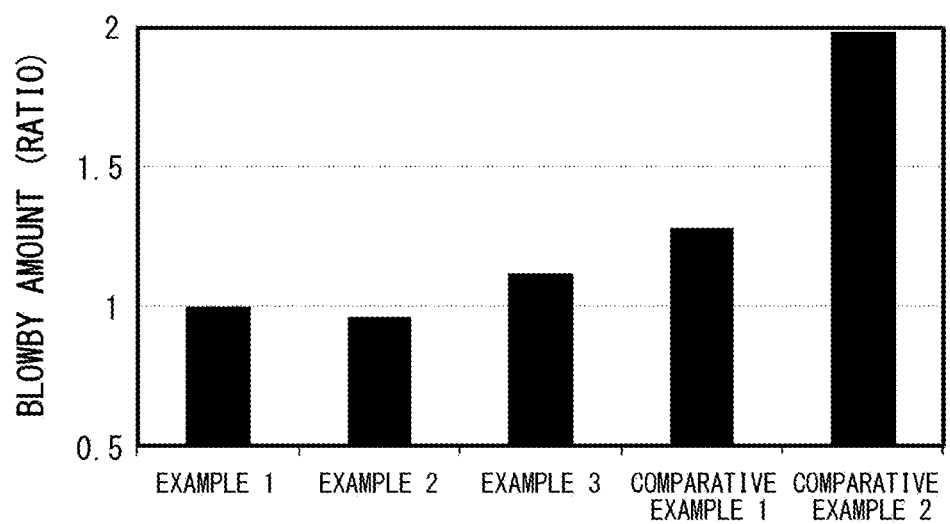
FIG. 12 is a graph comparing blowby amounts of combinations of piston rings according to examples 1 to 3 and combinations of piston rings according to the comparative examples 1 and 2.

FIG. 12 is a graph comparing blowby amounts of the combinations of the piston rings according to the examples 1 to 3 and the combinations of the piston rings according to the comparative examples 1 and 2. The vertical axis of FIG. 12 indicates a ratio of a blowby amount. As illustrated in FIG. 12, when the examples 1 to 3 and the comparative examples 1 and 2 are compared, amounts of a blowby gas is smaller in the examples 1 to 3 than in the comparative examples. Consequently, an effect of reducing the blowby gas by using the four compression rings without using an oil ring was successfully confirmed. When the example 1 and the example 2 are compared, the amount of the blowby gas is smaller in the example 2 than in the example 1. Consequently, an effect of reducing the blowby gas by forming the second compression ring in the barrel shape was successfully confirmed. When the examples 1 and 2 and the example 3 are compared, the amount of the blowby gas is smaller in the examples 1 and 2 than in the example 3. Consequently, an effect of reducing the blowby gas by setting s1(3)>s1(4) was successfully confirmed.

The preferred embodiments of the present invention are explained above. However, the various aspects explained above can be combined as much as possible. In the present invention, the combination of the piston rings may include five or more piston rings. However, to suppress an increase in the weight of the piston, it is more advantageous to configure the combination of the piston rings with only the four compression rings. Since the combination of the piston rings according to the embodiments explained above is configured by only the four compression rings, it is possible to suitably suppress an increase in the weight of the piston while making it possible to reduce a blowby gas and suppress an increase in oil consumption.

REFERENCE SIGNS LIST

100, 200: Internal combustion engine
110, 210: Combined structure of a piston and piston rings
120, 220: Combination of piston rings
10: Cylinder
20: Piston
30: Combustion chamber
40: Crank chamber
R1: First compression ring
R2: Second compression ring
R3: Third compression ring
R4: Fourth compression ring

The invention claimed is:

1. A combination of a plurality of piston rings assembled to a piston mounted in a cylinder of an internal combustion engine,
the combination of the piston rings comprising only four compression rings, wherein
an outer peripheral surface of a first compression ring assembled to a position closest to a combustion chamber of the internal combustion engine among the four compression rings includes a barrel surface including a top largest in diameter in the first compression ring and curved to be convex to a radial direction outer side in a cross section orthogonal to a peripheral length direction of the first compression ring,
an outer peripheral surface of a second compression ring assembled to a position next closest to the combustion chamber after the first compression ring among the four compression rings includes an outer peripheral end portion largest in diameter in the second compression ring and located further on a crank chamber side than an axial direction center of the second compression ring in a cross section orthogonal to a peripheral length direction of the second compression ring and a taper surface inclined to decrease in diameter from the outer peripheral end portion toward the combustion chamber side,
an outer peripheral surface of a third compression ring assembled to a position next closest to the combustion chamber after the second compression ring among the four compression rings includes an outer peripheral end portion largest in diameter in the third compression ring and located further on the crank chamber side than an axial direction center of the third compression ring in a cross section orthogonal to a peripheral length direction of the third compression ring and a taper surface inclined to decrease in diameter from the outer peripheral end portion toward the combustion chamber side, and
an outer peripheral surface of a fourth compression ring assembled to a position most distant from the combustion chamber among the four compression rings includes an outer peripheral end portion largest in diameter in the fourth compression ring and located further on the crank chamber side than an axial direction center of the fourth compression ring in a cross section orthogonal to a peripheral length direction of the fourth compression ring and a taper surface inclined to decrease in diameter from the outer peripheral end portion toward the combustion chamber side, when tension of the third compression ring is represented as Ft (3) and tension of the fourth compression system is represented as F (4), Ft (4)≥Ft (3) is satisfied, and when size of a fitting gap of the third compression ring is represented as s1 (3) and size of a fitting gap of the fourth compression ring is represented as s1 (4), s1 (3)≥s1 (4) is satisfied.

2. The combination of the piston rings according to claim 1, wherein, in at least any one compression ring among the second compression ring, the third compression ring, and the fourth compression ring, a step-like cutout is formed between a lower surface, which is an axial direction end face of the compression ring and faces a crank chamber side, and the outer peripheral end portion of the compression ring.

3. The combination of the piston rings according to claim 1, wherein, a twist angle of the third compression ring is 0' to −85' in a state in which the third compression ring is assembled to the piston and the piston is mounted in the cylinder.

4. An internal combustion engine comprising the piston and the combination of the piston rings according to claim 1, wherein speed of the piston in a rotation range in use of the internal combustion engine is lower than 18 m/s in average.

5. A combination of a plurality of piston rings assembled to a piston mounted in a cylinder of an internal combustion engine, the combination of the piston rings comprising only four compression rings, wherein an outer peripheral surface of a first compression ring assembled to a position closest to a combustion chamber of the internal combustion engine among the four compression rings includes a barrel surface including a top largest in diameter in the first compression ring and curved to be convex to a radial direction outer side in a cross section orthogonal to a peripheral length direction of the first compression ring, an outer peripheral surface of a second compression ring assembled to a position next closest to the combustion chamber after the first compression ring among the four compression rings includes a barrel surface including a top largest in diameter in the second compression ring and curved to be convex to a radial direction outer side in a cross section orthogonal to a peripheral length direction of the second compression ring, an outer peripheral surface of a third compression ring assembled to a position next closest to the combustion chamber after the second compression ring among the four compression rings includes an outer peripheral end portion largest in diameter in the third compression ring and located further on a crank chamber side than an axial direction center of the third compression ring in a cross section orthogonal to a peripheral length direction of the third compression ring and a taper surface inclined to decrease in diameter from the outer peripheral end portion toward the combustion chamber side, and an outer peripheral surface of a fourth compression ring assembled to a position most distant from the combustion chamber among the four compression rings includes an outer peripheral end portion largest in diameter in the fourth compression ring and located further on the crank chamber side than an axial direction center of the fourth compression ring in a cross section orthogonal to a peripheral length direction of the fourth compression ring and a taper surface inclined to decrease in diameter from the outer peripheral end portion toward the combustion chamber side, when tension of the third compression ring is represented as Ft (3) and tension of the fourth compression system is represented as F (4), Ft (4)≥Ft (3) is satisfied, and when size of a fitting gap of the third compression ring is represented as s1 (3) and size of a fitting gap of the fourth compression ring is represented as s1 (4), s1 (3)≥s1 (4) is satisfied.

6. The combination of the piston rings according to claim 5, wherein, in at least any one compression ring of the third compression ring and the fourth compression ring, a step-like cutout is formed between a lower surface, which is an axial direction end face of the compression ring and faces a crank chamber side, and the outer peripheral end portion of the compression ring.

* * * * *